US011518894B2

(12) United States Patent
Lasio et al.

(10) Patent No.: US 11,518,894 B2
(45) Date of Patent: Dec. 6, 2022

(54) FLUORINATED ESTER COMPOUND ADDITIVES FOR ARCHITECTURAL COATINGS

(71) Applicant: THE CHEMOURS COMPANY FC, LLC, Wilmington, DE (US)

(72) Inventors: Jelena Lasio, Bel Air, MD (US); Michael Henry Ober, Newark, DE (US); Francis J Woerner, Bear, DE (US); Hing Yim, Middletown, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 462 days.

(21) Appl. No.: 16/623,820

(22) PCT Filed: Jun. 11, 2018

(86) PCT No.: PCT/US2018/036822
§ 371 (c)(1),
(2) Date: Dec. 18, 2019

(87) PCT Pub. No.: WO2019/005460
PCT Pub. Date: Jan. 3, 2019

(65) Prior Publication Data
US 2021/0139716 A1 May 13, 2021

Related U.S. Application Data

(60) Provisional application No. 62/524,635, filed on Jun. 26, 2017.

(51) Int. Cl.
*C09D 7/65* (2018.01)
*C09D 7/63* (2018.01)
*C09D 5/02* (2006.01)
*C09D 113/02* (2006.01)
*C09D 5/00* (2006.01)
*C09D 5/16* (2006.01)
*C08K 5/02* (2006.01)
*C08K 5/10* (2006.01)
*C08K 5/372* (2006.01)

(52) U.S. Cl.
CPC ............... *C09D 7/65* (2018.01); *C09D 5/00* (2013.01); *C09D 5/024* (2013.01); *C09D 5/028* (2013.01); *C09D 5/1687* (2013.01); *C09D 7/63* (2018.01); *C09D 113/02* (2013.01); *C08K 5/02* (2013.01); *C08K 5/10* (2013.01); *C08K 5/372* (2013.01)

(58) Field of Classification Search
CPC ........ C09D 7/65; C09D 113/02; C09D 5/028; C09D 7/63
USPC ...................................... 106/287.27
See application file for complete search history.

(56) References Cited

U.S. PATENT DOCUMENTS

| 3,828,098 | A | 8/1974 | Gilleo |
| 3,952,066 | A | 4/1976 | Glickman |
| 4,266,080 | A | 5/1981 | Falk |
| 4,898,981 | A | 2/1990 | Falk |
| 4,946,992 | A | 8/1990 | Falk |
| 5,491,261 | A | 2/1996 | Haniff |
| 5,637,657 | A | 6/1997 | Anton |
| 5,670,573 | A | 9/1997 | Kirchner |
| 5,859,126 | A | 1/1999 | Anton |
| 2007/0066779 | A1 | 3/2007 | Otaguro |
| 2007/0212491 | A1 | 9/2007 | Yen |
| 2008/0145552 | A1* | 6/2008 | Berrettini ................. C09D 7/47 427/444 |

FOREIGN PATENT DOCUMENTS

| JP | H11349819 | 12/1999 |
| JP | 2011-20924 | 2/2011 |
| WO | 2016/176264 A1 | 11/2016 |
| WO | 2016/176270 A1 | 11/2016 |

OTHER PUBLICATIONS

ASTM D16.6501, Standard Terminology for Paint, Related Coatings, Materials and Applications, 10 Pages, Approved Dec. 1, 2014.

* cited by examiner

*Primary Examiner* — Hui H Chin

(57) ABSTRACT

The present invention is a composition of (a) a coating base selected from a water-dispersed coating, an epoxy polymer coating, an alkyd coating, a Type I urethane coating, or an unsaturated polyester coating; and (b) a fluorinated ester compound having a plurality of fluoroalkyl thioether groups, wherein the number average molecular weight of the fluorinated ester compound is ≤30,000 Da; and where the fluorinated group $R_f$ is independently a straight or branched perfluoroalkyl group of 2 to 20 carbon atoms, which is optionally interrupted by one or more $CH_2$, CFH, ether oxygens —O—, or combinations thereof. The fluorinated ester compounds provide cleanability to the resulting coating made from the present composition.

20 Claims, No Drawings

FLUORINATED ESTER COMPOUND ADDITIVES FOR ARCHITECTURAL COATINGS

This application represents a national filing under 35 U.S.C. 371 of International Application No. PCT/US2018/036822 filed Jun. 11, 2018, and claims priority of U.S. Provisional Application No. 62/524,635 filed Jun. 26, 2017.

FIELD OF THE INVENTION

This invention relates to a composition comprising a coating base and a fluorinated ester compound for use in architectural coating compositions such as water-based latex paints, to provide durable surface effects.

BACKGROUND OF THE INVENTION

The coating compositions of interest in the present invention include alkyd coating compositions, urethane coating compositions, water-dispersible coating compositions, and unsaturated polyester coating compositions, typically a paint, clear coating, or stain. All of the above-listed coating compositions after drying or curing often show low hexadecane contact angles, are readily wetted by oil, and are susceptible to soiling. The coating compositions are described in *Outlines of Paint Technology* (Halstead Press, New York, N.Y., Third edition, 1990) and *Surface Coatings Vol. I, Raw Materials and Their Usage* (Chapman and Hall, New York, N.Y., Second Edition, 1984).

Water-based latex coating bases, such as those employed as paint coatings, have a tendency to have low oil repellency and poor cleanability ratings. To impart better cleanability to interior and exterior paint surfaces, small molecule additives, including fluorosurfactants, have been used. However, the additives do not provide long-term performance and durability in exterior paint, which is subjected to more extreme environmental conditions. The additives can wash away from the coating surface within a few days.

BRIEF SUMMARY OF THE INVENTION

The present invention addresses the issues described above by introducing fluorinated ester compounds. The compounds are small enough to migrate to the coating surface while wet but stable enough to withstand being subjected to harsh elements. The thioether groups of the present fluorinated ester compounds provide a hydrolytic stability that provides a performance benefit over the known fluorinated ester compounds. The compositions of the present invention provide performance as well as durability to the water-based latex coatings. They impart unexpectedly desirable surface effects such as: increased water and oil contact angles, enhanced dirt pickup resistance, and enhanced cleanability to the coating films.

The present invention relates to a composition comprising (a) a coating base selected from a water-dispersed coating, an epoxy polymer coating, an alkyd coating, a Type I urethane coating, or an unsaturated polyester coating; and (b) a fluorinated ester compound having a plurality of fluoroalkyl thioether groups, said fluorinated ester compound selected from Formula (I), Formula (II), Formula (III), or Formula (IV):

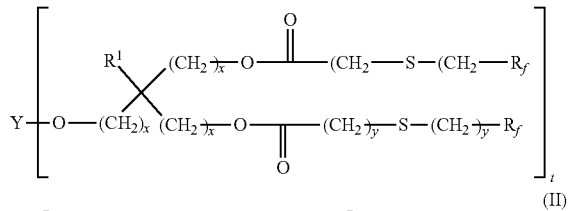

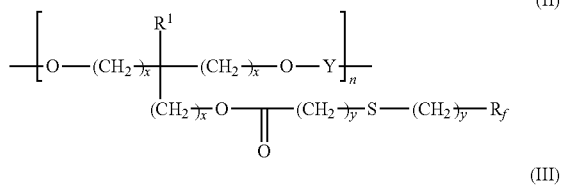

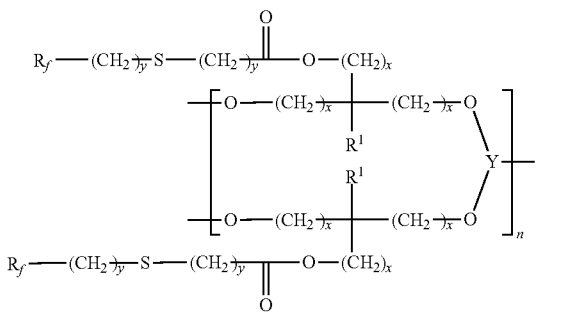

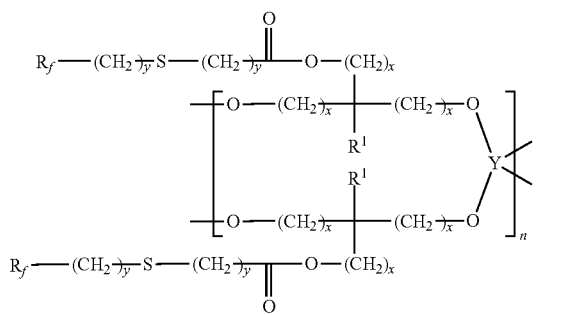

wherein the number average molecular weight of the fluorinated ester compound is ≤30,000 Da; $R^1$ is a linear or branched $C_1$ to $C_4$ alkyl group; t is an integer of 2 to 4; n is an integer ≥3; x is independently an integer of 1 to 4; y is independently an integer of 1 to 10; Y is a linear or branched organic linking group that is divalent, trivalent, or tetravalent, selected from the group consisting of linear or branched $C_1$ to $C_{20}$ alkylene groups, carbonyl groups, thioether groups, aryl groups, cycloalkyl groups, ether groups, hydroxyl groups, —NHC(O)—, uretdione, allophanate, isocyanurate, and mixtures thereof; and $R_f$ is independently a straight or branched perfluoroalkyl group of 2 to 20 carbon atoms, optionally interrupted by one or more $CH_2$, CFH, ether oxygens —O—, or combinations thereof.

The present invention further comprises an article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound having a plurality of fluoroalkyl thioether groups, said fluorinated ester compound selected from Formula (I), Formula (II), Formula (III), or Formula (IV) wherein the number average molecular weight of the fluorinated ester compound is ≤30,000 Da; $R^1$ is a linear or branched $C_1$ to $C_4$ alkyl group; t is an integer of 2 to 4; n is an integer ≥3; x is independently an integer of 1 to 4; y is independently an integer of 1 to 10; Y is a linear or branched organic linking group that is divalent, trivalent, or tetravalent, selected from the group consisting of linear or branched $C_1$ to $C_{20}$ alkylene groups, carbonyl groups, thioether groups, aryl groups, cycloalkyl groups, ether groups, hydroxyl groups, —NHC(O)—, uretdione, allophanate, isocyanurate, and mixtures thereof; and $R_f$ is independently a straight or branched perfluoroalkyl group of 2 to 20 carbon atoms, optionally interrupted by one or more $CH_2$, CFH, ether oxygens —O—, or combinations thereof.

DETAILED DESCRIPTION OF THE INVENTION

Herein trademarks are shown in upper case.

The terms "(meth)acrylic" or "(meth)acrylate" indicate, respectively, methacrylic and/or acrylic, and methacrylate and/or acrylate; and the term (meth)acrylamide indicates methacrylamide and/or acrylamide.

By the term "alkyd coating" as used hereinafter is meant a conventional liquid coating based on alkyd resins, typically a paint, clear coating, or stain. The alkyd resins are complex branched and cross-linked polyesters containing unsaturated aliphatic acid residues.

By the term "urethane coating" as used hereinafter is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D16 into five categories. Type I urethane coatings contain a minimum of 10% by weight of a pre-reacted autoxidizable binder, characterized by the absence of significant amounts of free isocyanate groups. These are also known as uralkyds, urethane-modified alkyds, oil-modified urethanes, urethane oils, or urethane alkyds. Type I urethane coatings are the largest volume category of polyurethane coatings and include paints, clear coatings, or stains. The cured coating for a Type I urethane coating is formed by air oxidation and polymerization of the unsaturated drying oil residue in the binder.

By the term "unsaturated polyester coating" as used hereinafter is meant a conventional liquid coating based on unsaturated polyester resins, dissolved in monomers and containing initiators and catalysts as needed, typically as a paint, clear coating, stain, or gel coat formulation.

By the term "water-dispersed coatings" as used herein is meant surface coatings intended for the decoration or protection of a substrate, comprising essentially an emulsion, latex, or suspension of a film-forming material dispersed in an aqueous phase, and optionally containing surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints, unpigmented coatings such as wood sealers, stains, and finishes, coatings for masonry and cement, and water-based asphalt emulsions. For latex paints the film forming material is a latex polymer of acrylate acrylic, styrene acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "coating base" as used herein is meant a liquid formulation of a water-dispersed coating, an epoxy polymer coating, an alkyd coating, a Type I urethane coating, or an unsaturated polyester coating, which is later applied to a substrate for the purpose of creating a lasting film on said surface. The coating base includes those solvents, pigments, fillers, and functional additives found in a conventional liquid coating. For example, the coating base formulation may include a polymer resin and pigment dispersed in water, where the polymer resin is an acrylic polymer latex, vinyl-acrylic polymer, vinyl polymer, Type I urethane polymer, alkyd polymer, epoxy polymer, or unsaturated polyester polymer, or mixtures thereof.

The present invention relates to a composition comprising (a) a coating base selected from a water-dispersed coating, an epoxy polymer coating, an alkyd coating, a Type I urethane coating, or an unsaturated polyester coating; and (b) a fluorinated ester compound having a plurality of fluoroalkyl thioether groups, said fluorinated ester compound selected from Formula (I), Formula (II), Formula (III), or Formula (IV):

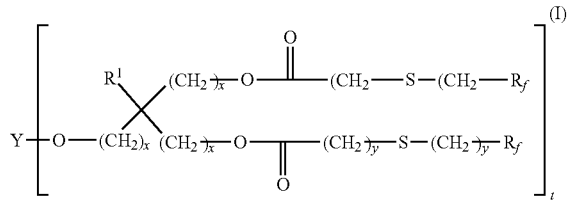

(I)

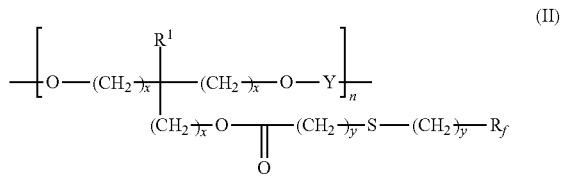

(II)

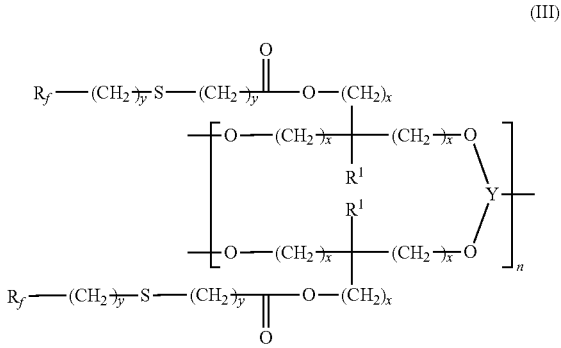

(III)

(IV)

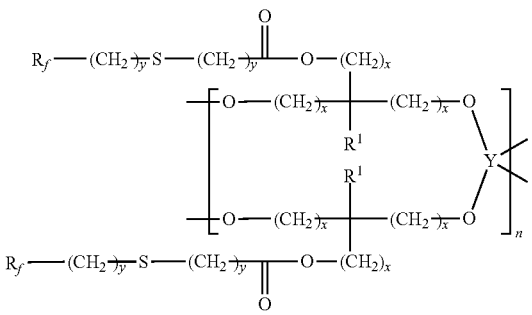

wherein the number average molecular weight of the fluorinated ester compound is ≤30,000 Da; $R^1$ is a linear or branched $C_1$ to $C_4$ alkyl group; t is an integer of 2 to 4; n is an integer ≥3; x is independently an integer of 1 to 4; y is independently an integer of 1 to 10; Y is a linear or branched organic linking group that is divalent, trivalent, or tetravalent, selected from the group consisting of linear or branched $C_1$ to $C_{20}$ alkylene groups, carbonyl groups, thioether groups, aryl groups, cycloalkyl groups, ether groups, hydroxyl groups, —NHC(O)—, uretdione, allophanate, isocyanurate, and mixtures thereof; and $R_f$ is independently a straight or branched perfluoroalkyl group of 2 to 20 carbon atoms, optionally interrupted by one or more $CH_2$, CFH, ether oxygens —O—, or combinations thereof.

By the term "Y is a linear or branched organic linking group that is divalent, trivalent, or tetravalent, selected from the group consisting of linear or branched $C_1$ to $C_{20}$ alkylene groups, carbonyl groups, thioether groups, aryl groups, cycloalkyl groups, ether groups, hydroxyl groups, —NHC(O)—, uretdione, allophanate, isocyanurate, and mixtures thereof", it is meant that Y is an organic group composed of the noted functional groups in any order. In Formulas (I)-(IV), Y connects multiple fluorinated ester substitutions having a hydrolytically stable thioether group. In one aspect, the fluorinated ester compound is selected from Formula (I), and t is 2 or 3. In another aspect, t is 2. In one aspect, the fluorinated ester compound is selected from Formula (II), (III), or (IV), and n is 3 to 50; in another aspect, n is 3 to 30; and in a third aspect, n is 3 to 15.

As stated previously, the number average molecular weight ($M_n$) of the fluorinated ester compound is ≤30,000 Da. In one aspect, $M_n$ of the fluorinated ester compound is 1000 to 20,000 Da; and in another aspect $M_n$ is 1000 to 10,000 Da. Compounds of Formula (I) have a single molecular weight (no molecular weight distribution), and the $M_n$ can be determined by identifying the chemical structure and calculating the molecular weight by a summation of elements. For compounds having a distribution of molecular weights, including the polymeric structures of Formulas (II), (III), or (IV), the value $M_n$ can be measured by size exclusion chromatography (SEC). The chemical structure can be confirmed by dissolving the compound in a deuterated solvent, such as deuterated chloroform, and performing $^1H$ NMR. SEC can be performed by a gel permeation chromatographer (GPC) equipped with a refractive index detector and using polystyrene standards.

As the number of fluorinated branches increase, the compound becomes less soluble in water. In one embodiment, the fluorinated ester compound is water insoluble. In one aspect, the composition comprises a mixture of two or more different fluorinated ester compounds represented by Formulas (I), (II), (III), or (IV).

In Formulas (I)-(IV), Y may be a divalent, trivalent, or tetravalent organic group. The fluorinated ester compounds of each Formula are formed from a linking organic group Y, a quarternary carbon-containing group such as a trialkanol alkane, and a fluorinated thioether group. Formula (I) is a non-polymeric compound having t number of valencies on organic group Y and having 2t number of fluorinated thioether branches. Formula (II) is a polymeric fluorinated ester, where Y is divalent, the quarternary carbon is part of the polymeric backbone, where the repeat unit contains one fluorinated thioether pendant group. Formula (III) is a polymeric fluorinated ester, where Y is trivalent, with one ether oxygen —O— of the repeat unit head connecting to Y of the repeat unit tail, and where the repeat unit contains two quarternary carbons and two pendant fluorinated thioether groups. Formula (IV) is a polymeric fluorinated ester, where Y is tetravalent, with one ether oxygen —O— of the repeat unit head connecting to one Y bond from another repeat unit tail, each repeat unit having two quarternary carbons in the polymer backbone and having two pendant fluorinated thioether groups.

In one embodiment, the fluorinated ester compounds are the reaction products of a quarternary carbon-containing polyol, a fluorinated iodide, a thioalkanoic acid, and a thiol-reactive or hydroxy-reactive compound. One method for forming the fluorinated ester compounds comprises reacting a quarternary carbon-containing polyol with a thioalkanoic acid in the presence of a solvent or other thiol-reactive compound to form a thioacetal, followed by reaction with a fluorinated iodide to form the final product. In this case, Y is derived from the thiol-reactive compound and thioalkanoic acid structures. In another method, a fluorinated iodide is reacted with a thioalkanoic acid to form a fluorinated thioalkanoic acid, which is reacted with a quarternary carbon-containing polyol to form a hydroxy-functional fluorinated diester. This hydroxy-functional fluorinated diester is then reacted with a compound having two hydroxy-reactive functional groups such as an oxalyl halide to form the final product. In this embodiment, Y is derived from the hydroxy-reactive compound. In one embodiment, the quarternary carbon-containing polyol has at least 3 hydroxyl groups. Common quarternary carbon-containing polyols include, but are not limited to, pentaerythritol, dipentaerythritol, trimethylolpropane, ditrimethylolpropane, trimethylolethane, ditrimethylolethane, glycerol, tetraester polyols, and mixtures thereof. Common thioalkanoic acids include, but are not limited to, 3-thiopropionic acid, 2-thioglycolic acid, and mixtures thereof. Thioacetal products, such as trimethylolpropane tris(3-mercaptopropionate) are also readily available. Thiol-reactive compounds and solvents include, but are not limited to, methyl isobutyl ketone (MIBK), methyl ethyl ketone, diethyl ketone, methyl isopropyl ketone, acetone, benzophenone, acetophenone, benzyl methyl ketone, and mixtures thereof. Hydroxy-reactive compounds include, but are not limited to, oxalyl chloride, polyisocyanates (including but not limited to diisocyanates or triisocyanates), and mixtures thereof.

Where the hydroxy-reactive compound is a polyisocyanate, any polyisocyanate having two or more isocyanate groups is suitable for use in the invention. For example, hexamethylene diisocyanate and hexamethylene diisocyanate homopolymers are suitable for use herein and are commercially available. It is recognized that minor amounts of diisocyanates can remain in products having multiple isocyanate groups. An example of this is a biuret containing residual small amounts of hexamethylene diisocyanate. Also suitable for use as the polyisocyanate reactant are hydrocarbon diisocyanate-derived isocyanurate trimers, including DESMODUR N-100 (a hexamethylene diisocyanate-based vailable from Bayer Corporation, Pittsburgh, Pa.). Other triisocyanates useful for the purposes of this invention are those obtained by reacting three moles of toluene diisocyanate. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention. These compounds may contain biuret structures and may contain both aliphatic and aromatic substituents. Suitable structures include hexamethylene diisocyanate homopolymers such as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane, for instance as DESMODUR W (Bayer Corporation) and diisocyanate trimers of formulas (Va), (Vb), (Vc) and (Vd):

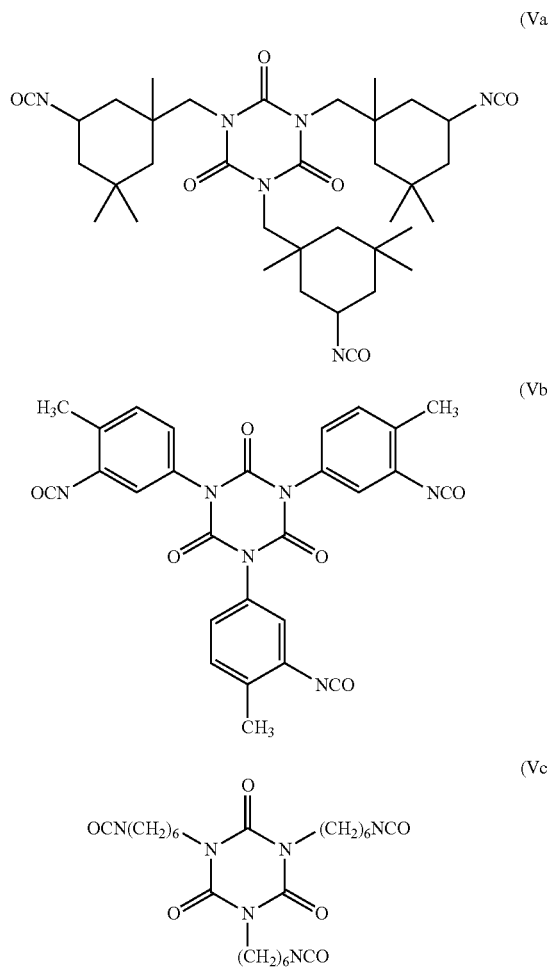

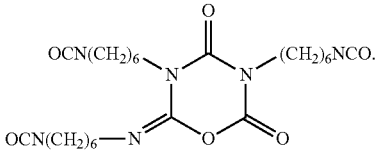

The diisocyanate trimers (Va-d) are available, for instance as DESMODUR Z4470, DESMODUR IL, DESMODUR N-3300, and DESMODUR XP2410, respectively, from Bayer Corporation.

The term "residue from a polyisocyanate" defines the portion of a polyisocyanate compound that results when the —NCO group is removed. For example, in the structure OCN—$(CH_2)_6$—NCO, the residue A would be —$(CH_2)_6$—. Such residues are at least divalent structures, including divalent, trivalent, or tetravalent, and may include functional groups such as linear or branched $C_1$-$C_{20}$ alkylene groups, aryl groups, cycloaliphatic groups, allophanate groups, uretdione groups, isocyanurate groups, iminooxadiozindione groups, or mixtures thereof. In this case, the uretdione groups, allophanate groups, isocyanurate groups, and iminooxadiozindione groups result from dimerization, trimerization, or polymerization of polyisocyanates.

The fluorinated ester compounds have a plurality of fluoroalkyl thioether groups as end groups. These end groups are part of a non-polymeric branched structure, or are pendant groups of a polymeric repeat unit. In one embodiment, $R_f$ is a straight or branched perfluoroalkyl group of 4 to 12 carbon atoms, optionally interrupted by one or more —$CH_2$—, —CFH—, ether oxygens —O—, or combinations thereof; in another embodiment, $R_f$ is a straight or branched perfluoroalkyl group of 4 to 6 carbon atoms, optionally interrupted by one or more —$CH_2$—, —CFH—, ether oxygens —O—, or combinations thereof. Examples of fluorinated iodides used to form the fluorinated ester compounds include but are not limited to $C_4F_9(CH_2)_2OH$, $C_6F_{13}(CH_2)_2I$, $C_8F_{17}(CH_2)_2I$, $C_4F_9I$, $C_6F_{13}I$, $C_8F_{17}I$, $C_4F_9CH_2CH_2CH_2I$, $C_6F_{13}CH_2CH_2CH_2I$, $C_4F_9CH_2I$, $C_6F_{13}CH_2I$, $C_4F_9CH_2CF_2CH_2CH_2I$, $C_6F_{13}CH_2CF_2CH_2CH_2I$, $C_4F_9CH_2CF_2CH_2CF_2CH_2CH_2I$, $C_6F_{13}CH_2CF_2CH_2CF_2CH_2CH_2I$, $C_3F_7OCF_2CF_2CH_2CH_2I$, $C_2F_6OCF_2CF_2CH_2CH_2I$, $CF_{30}CF_2CF_2CH_2CH_2I$, $C_3F_7(OCF_2CF_2)_2CH_2CH_2I$, $C_2F_5(OCF_2CF_2)_2CH_2CH_2I$, $CF_3(OCF_2CF_2)_2CH_2CH_2I$, $C_3F_7OCHFCF_2OCH_2CH_2I$, $C_2F_5OCHFCF_2OCH_2CH_2I$, $CF_3OCHFCF_2OCH_2CH_2I$, $C_3F_7OCHFCF_2OCH_2CH_2CH_2I$, $C_2F_5OCHFCF_2OCH_2CH_2CH_2I$, $CF_3OCHFCF_2OCH_2CH_2CH_2I$, $C_4F_9CH_2CH_2CF_2CF_2CH_2CH_2I$, $HCF_2(CF_2)_4CH_2I$, $HCF_2(CF_2)_6CH_2I$, $HCF_2(CF_2)_8CH_2I$, and similar variations thereof.

The organic group Y is a divalent, trivalent, or tetravalent structure that links the fluorinated thioether groups together. In one embodiment, Y is selected from the group consisting of —$(CH_2)_zC(R^2)(OH)(CH_2)_z$—, an uninterrupted $C_1$ to $C_{20}$ linear or branched alkylene, —C(O)—C(O)—, —C(O)—$(CH_2)_z$—S—$(CH_2)_r$—S—$(CH_2)_z$—C(O)—, —C(O)—$(CH_2)_z$—O—$(CH_2)_r$—O—$(CH_2)_z$—C(O)—, —C(O)—$(CH_2)_z$—S—$C(R^2)(R^3)$—S—$(CH_2)_z$—C(O)—, —C(O)—$(CH_2)_z$—O—$C(R^2)(R^3)$—O—$(CH_2)_z$—C(O)—, —C(O)NH-A-NHC(O)—; wherein z is an integer of 1 to 4; r is an integer of 1 to 20, $R^2$ is H, a linear or branched $C_1$ to $C_6$ alkyl group, or an aryl group; $R^3$ is H, a linear or branched $C_1$ to $C_6$ alkyl group, or an aryl group, and A is the residue from a polyisocyanate. In one embodiment, z is 1 or 2. In one embodiment, r is 1 to 10; and in another embodiment, r is 1 to 6. In one embodiment, $R^2$ and $R^3$ are independently linear or branched $C_1$ to $C_4$ alkyl groups. In another embodiment, $R^2$ and $R^3$ are both H. In one aspect, z is 1 and $R^2$ is H. In another aspect, z is 2, $R^2$ is $CH_3$, and $R^3$ is $CH_2CH(CH_3)_2$.

The fluorinated ester compounds are useful as coatings additives, wherein the fluorinated ester compound can be added to a coating base, which is applied to a substrate. The fluorinated ester compound may be added directly, or may be added in the form of an aqueous dispersion, aqueous emulsion, or in organic solvent solution. In one aspect, the composition comprising a coating base in an amount of about 95 to 99.98% and the fluorinated ester compound in an amount of about 0.02 to 5% by weight, based on the total weight of the coating base and fluorinated ester compound, which equals 100%.

As noted above, the coating base is a liquid formulation of a water-dispersed coating, an epoxy polymer coating, an alkyd coating, a Type I urethane coating, or an unsaturated polyester coating, which is later applied to a substrate for the purpose of creating a lasting film on said surface. In one embodiment, the coating base is a water-dispersed coating in the form of an aqueous acrylic latex paint. The coating base includes those solvents, pigments, fillers, and functional additives found in a conventional liquid coating. Typically, the coating base may include a resin compound from 10 to 60% by weight, from 0.1 to 80% by weight of functional additives including pigments, fillers, and other additives, and the balance of the coating base composition is water or solvent. For an architectural coating, the resin compound is in an amount of about 30 to 60% by weight, functional additives including pigments, extenders, fillers, and other additives are in an amount of 0.1 to 60% by weight, with the balance being water or solvent.

The coating compositions may also include a pigment. Such a pigment may be part of the coating base formulation, or may be added subsequently. Any pigment can be used with the present invention. The term "pigment" as used herein means opacifying and non-opacifying ingredients which are particulate and substantially non-volatile in use. Pigment as used herein includes ingredients labeled as pigments, but also ingredients typically labeled in the coating trade as inerts, extenders, fillers, and similar substances.

Representative pigments that can be used with the present invention include, but are not limited to, rutile and anatase $TiO_2$, clays such as kaolin clay, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, MONASTAL Blue G (C.I. Pigment Blue 15), molybdate Orange (C.I. Pigment Red 104), Toluidine Red YW (C.I. Pigment 3)—process aggregated crystals, Phthalo Blue (C.I. Pigment Blue 15)—cellulose acetate dispersion, Toluidine Red (C.I. Pigment Red 3), Watchung Red BW (C.I. Pigment Red 48), Toluidine Yellow GW (C.I. Pigment Yellow 1), MONASTRAL Blue BW (C.I. Pigment Blue 15), MONASTRAL Green BW (C.I. Pigment Green 7), Pigment Scarlet (C.I. Pigment Red 60), Auric Brown (C.I. Pigment Brown 6), MONASTRAL Green G (C.I. Pigment Green 7), MONASTRAL Maroon B, MONASTRAL Orange, and Phthalo Green GW 951.

Titanium dioxide ($TiO_2$) is the preferred pigment to use with the present invention. Titanium dioxide pigment, useful in the present invention, can be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

The fluorinated ester compound is effectively introduced to the coating base by thoroughly contacting, e.g., by mixing the complex compound composition with the coating base. The contacting of complex compound and coating base can be performed, for example and conveniently, at ambient temperature. More elaborate contacting or mixing methods can be employed such as using a mechanical shaker or providing heat. Such methods are generally not necessary and generally do not substantially improve the final coating composition.

The complex compound of the invention is generally added at about 0.02 weight % to about 5 weight % on a dry weight basis of the polymer compound to the weight of the wet paint. In one embodiment, from about 0.02 weight % to about 0.5 weight % is used, and in a third embodiment, from about 0.05 weight % to about 0.25 weight % of the complex compound is added to the paint.

In another embodiment, the invention is an article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound having a plurality of fluoroalkyl thioether groups, said fluorinated ester compound selected from Formula (I), Formula (II), Formula (III), or Formula (IV) wherein the number average molecular weight of the fluorinated ester compound is ≤30,000 Da; $R^1$ is a linear or branched $C_1$ to $C_4$ alkyl group; t is an integer of 2 to 4; n is an integer 3; x is independently an integer of 1 to 4; y is independently an integer of 1 to 10; Y is a linear or branched organic group that is divalent, trivalent, or tetravalent, selected from the group consisting of $C_1$ to $C_{20}$ alkylene groups, carbonyl groups, thioether groups, aryl groups, ether groups, hydroxyl groups, and mixtures thereof; and $R_f$ is independently a straight or branched perfluoroalkyl group of 2 to 20 carbon atoms, optionally interrupted by one or more $CH_2$, CFH, ether oxygens —O—, or combinations thereof.

The coating compositions of the present invention are useful for providing a protective and/or decorative coating to a wide variety of substrates. Such substrates include primarily construction materials and hard surfaces. The substrate is preferably selected from the group consisting of wood, metal, wallboard, masonry, concrete, fiberboard, and paper. Other materials may also be used as the substrate. Any method of contacting a coating composition with a substrate can be used. Such methods are well known to a person skilled in the art, such as by brush, spray, roller, doctor blade, wipe, dip, foam, liquid injection, immersion or casting.

The compositions of the present invention provide performance as well as durability to coatings. They impart unexpectedly desirable surface effects such as: increased water and oil contact angles, enhanced dirt pickup resistance, and enhanced cleanability to the coating films. For these reasons, the compositions of the present invention are particularly useful in exterior coatings and paints.

Materials and Test Methods

All solvents and reagents, unless otherwise indicated, were purchased from Sigma-Aldrich, St. Louis, Mo., and used directly as supplied.

Perfluorohexylethyl iodide and CAPSTONE FS-61 were obtained from The Chemours Company, Wilmington Del. CAPSTONE FS-61 is an ammonium salt of a partially fluorinated alcohol/$P_2O_5$ reaction product.

Test Methods

Dosing of Additives in Paint and Test Panel Application

Aqueous dispersions of fluoroacrylic copolymers of the present invention were added at 350 ppm or 1000 ppm fluorine levels to selected commercially available exterior latex paints that were, prior to dosing, free of fluoroadditives. The sample was mixed using an overhead Cowles Blade stirrer at 600 rpm for 10 minutes. The mixture was then transferred to a glass bottle, sealed and placed on a roll mill overnight to allow uniform mixing of the fluoropolymer. The samples were then drawn down uniformly on an Aluminium Q-panel (4"×12") via a BYK-Gardner drawdown apparatus using 5 mL bird-applicator. The paint films were then allowed to dry at room temperature for 7 days.

Test Method 1. Evaluation of Oil and Water Repellency Via Contact Angle Measurement Oil and water contact angle measurements were used to test for the migration of fluoroadditive to the surface of the paint film. Oil and water contact angle testing was performed by goniometer on 1 inch strips of Leneta panel coated with dried paint film. A Ramé-Hart Standard Automated Goniometer Model 200 employing DROPimage standard software and equipped with an automated dispensing system, 250 µl syringe, and illuminated specimen stage assembly was used. The goniometer camera was connected through an interface to a computer, allowing the droplet to be visualized on a computer screen. The horizontal axis line and the cross line could both be independently adjusted on the computer screen using the software.

Prior to contact angle measurement, the sample was placed on the sample stage and the vertical vernier was adjusted to align the horizontal line (axis) of the eye piece coincident to the horizontal plane of the sample. The horizontal position of the stage relative to the eye piece was positioned so as to view one side of the test fluid droplet interface region at the sample interface.

To determine the contact angle of the test fluid on the sample, approximately one drop of test fluid was dispensed onto the sample using a 30 µL pipette tip and an automated dispensing system to displace a calibrated amount of the test fluid. For oil contact angle measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is the angle determined immediately after dispensing the test fluid to the sample surface. Initial contact angles above 30 degrees are indicators of effective oil repellency.

Test Method 2. Dirt Pick-Up Resistance (DPR) Test for Exterior Paints

DPR testing was used to evaluate the ability of the painted panels to prevent dirt accumulation. An artificial dry dirt comprised of silica gel (38.7%), aluminum oxide powder (38.7%), black iron oxide powder (19.35%) and lamp black powder (3.22%) was used for this test. The dust components were mixed and placed on a roller for 48 hours for thorough mixing and stored in a dessicator.

Exterior paint samples were drawn down to Aluminium Q-panels cut to a size of 1.5"×2", and four replicates of these samples were taped onto a 4"×6" metal panel. The initial whiteness ($L^*_{initial}$) of each Q-panel was measured using a Hunter Lab colorimeter. The 4"×6" metal panel was then inserted into a 45 degree angle slot cut in a wooden block. The dust applicator containing metal mesh dispensed the dust on the panels until the panels were completely covered with dust. The excess dust was then removed by lightly tapping the mounted panels 5 times on the wooden block inside the shallow tray. The 4"×6" panel which held the dusted panels was then clamped onto a Vortex-Genie 2 for 60 seconds to remove any remaining dust. The panel was then removed and tapped 10 times to dislodge any remaining dust. The whiteness ($L^*_{dusted}$) of each 1.5"×2" sample was re-measured using the same colorimeter, and the difference in whiteness before and after dusting was recorded. The values were averaged. DPR is expressed in terms of $\Delta L^*$, where $\Delta L^* = (L^*\text{initial} - L^*_{dusted})$. A lower $\Delta L^*$ value indicates better dirt pick-up resistance.

Test Method 3. Weathering (WOM) for DPR and Oil Contact Angle Durability

Accelerated weathering of coated Q-panels was performed in an ATLAS Ci5000 Xenon Lamp Weather-o-Meter. The Xenon lamp was equipped with Type S Boro Inner and Outer Filters. Weathering cycles were performed according to D6695, cycle 2. During the weathering period, the panels were subjected to repeated 2-hour programs, which included 18 minutes of light and water spray followed by 102 minutes of light only. During the entire program, panels were held at 63° C. and during the UV only segment relative humidity was held at 50%.

For a 24-hour WOM program, freshly coated aluminum Q-panels were allowed to air dry for 7-days. The initial whiteness (L*initial) of each Q-panel was measured using a Hunter Lab colorimeter. One set of panels was subjected to DPR testing (as per Test Method 2) as well as oil and water contact angle testing (as per Test Method 1). A duplicate set of panels was placed in the weather-o-meter and allowed to proceed through 12 continuous 2-hour cycles according to the description above. After completion of the weathering cycles, the panels were dried, evaluated according to Test Methods 1 and 2, and re-subjected to DPR.

Measurements were recorded after the first application of artificial dry dirt (Initial), 24-hour WOM following the $1^{st}$ artificial dry dirt application (1 day $1^{st}$ dust), on a panel that was left clean for 24-hour WOM and then applied with a first artificial dry dirt application (1 day new dust), on a panel where a $2^{nd}$ artificial dry dirt application was made on the 1 day $1^{st}$ dust panel (1 day $2^{nd}$ dust), 48-hour WOM of the 1 day $2^{nd}$ dust panel (3 day $2^{nd}$ dust), and on a panel where a $3^{rd}$ artificial dry dirt application was made on the 3 day $2^{nd}$ dust panel (3 day $3^{rd}$ dust).

Test Method 4. Size Exclusion Chromatography (SEC)

The molecular weight in Daltons and polydispersity were determined using a PL220 GPC system at 35° C. with a refractive index detector and evaporative light scattering detector (Polymer Laboratories). The value from the refractive index detector was chosen. Column set: three PSS 5 µm SDV 300×8 mm+one PSS 5 µm guard column. HPLC Grade THF (Unstabilized, OmniSolv) was used as eluent with a flow rate of 1 mL/minute. The molecular weights and polydispersity of the sample were calculated relative to polystyrene standards (Agilent EasiVials: High Green, Medium Red and Green, Low Yellow; Calibration range, 400 Daltons to 1,000,000 Daltons).

EXAMPLES

Preparation 1: Fluorinated 3-Thiopropionic Acid

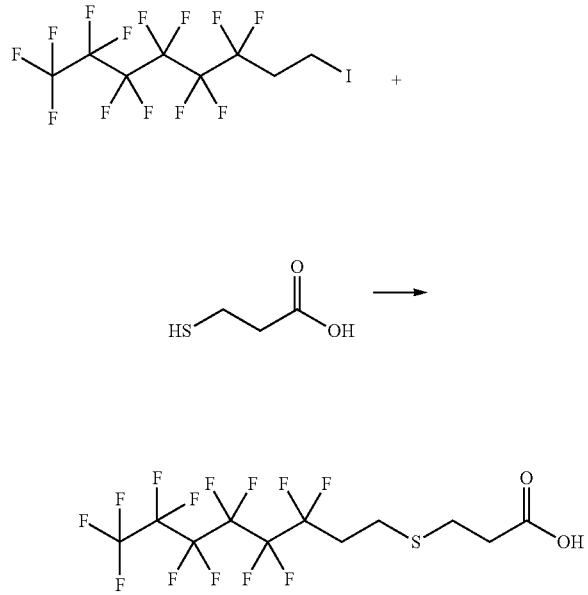

A 1 liter flask was equipped with a thermocouple, mechanical stirrer, reflux condenser, nitrogen inlet, and addition funnel. The reactor flask was charged with perfluorohexylethyl iodide (173 g), isopropanol (158 g), and 3-thiopropionic acid (42.7 g), and the mixture was heated to reflux at 80° C. An aqueous $K_2CO_3$ solution (57 g in 83.5 g water) was added dropwise while maintaining a temperature of 80° C. The mixture was held at reflux for an additional 5.5 hours until none of the starting iodide could be detected. The mixture was cooled to below 40° C. and gradually neutralized with an aqueous solution of HCl (41 g in 220 g of water). The mixture was stirred for an additional 15 minutes at 50° C. The organic material was extracted and solvent was removed by distillation to yield the compound $C_6F_{13}CH_2CH_2SCH_2CH_2COOH$.

Preparation 2: Hydroxy-Functional Fluorinated Diester and Dihydroxy-Functional Fluorinated Monoester

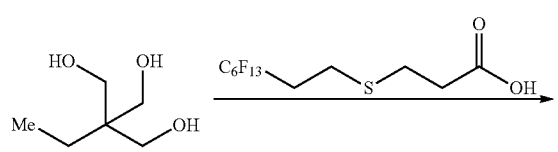

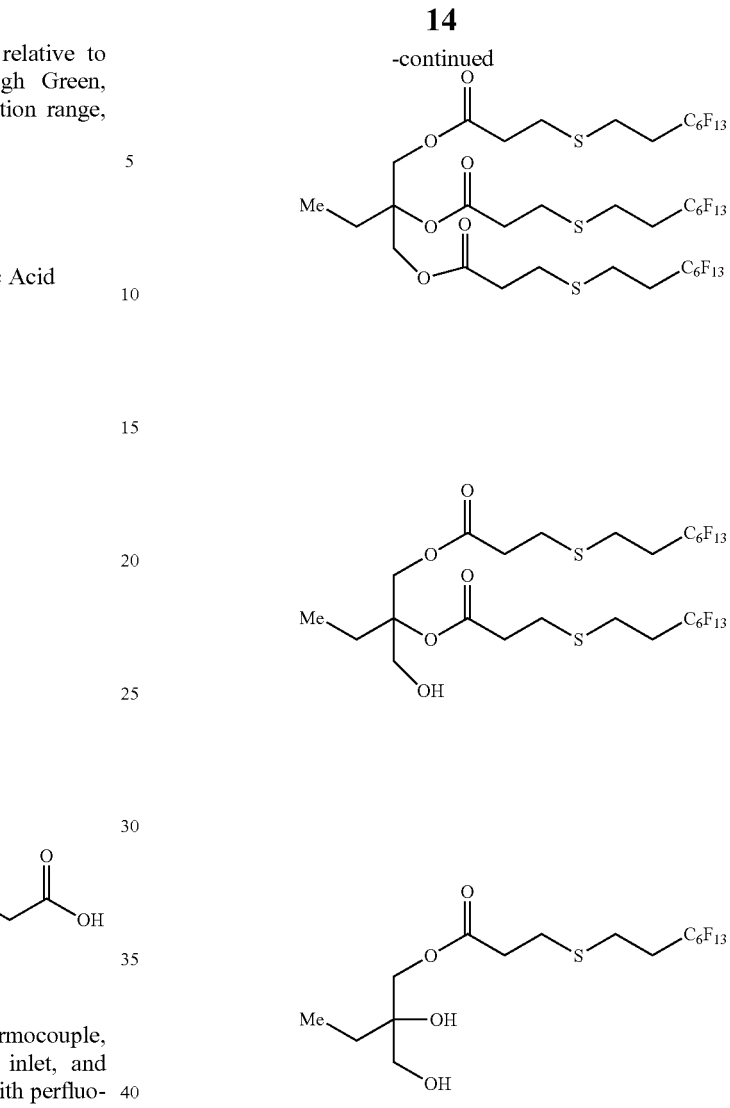

To a 200-mL two necked round bottom flask equipped with a short path distillation apparatus, a nitrogen inlet, thermometer, and a magnetic stir bar was added 2-ethyl-2-(hydroxymethyl)propane-1,3-diol (5 g, 37.3 mmol), $F_{13}CH_2CH_2SCH_2CH_2COOH$ from Preparation 1 (33.7 g, 74.6 mmol), and p-toluenesulfonic acid (0.300 g, 1.58 mmol). The mixture was heated to 160° C. while collecting the byproduct water in the collection flask. After six hours, the reaction was let to cool to room temperature, and then purified by column chromatography (Ethyl acetate: Hexane=1:10, 1:7.5, 1:6, 1:5, 1:4). The trifluoroester (12.16 g, 23%), hydroxy-functional fluorinated diester (15.26 g, 41%) and dihydroxy-functional fluorinated monoester (3.04 g, 14%) were isolated.

Comparative Example A

A calculated amount of CAPSTONE FS-61 (350 ppm F) was used side by side with examples for testing on both exterior paints as per the test methods described.

Comparative Example B

Exterior paint with no additive was tested according to the test methods described.

Example 1

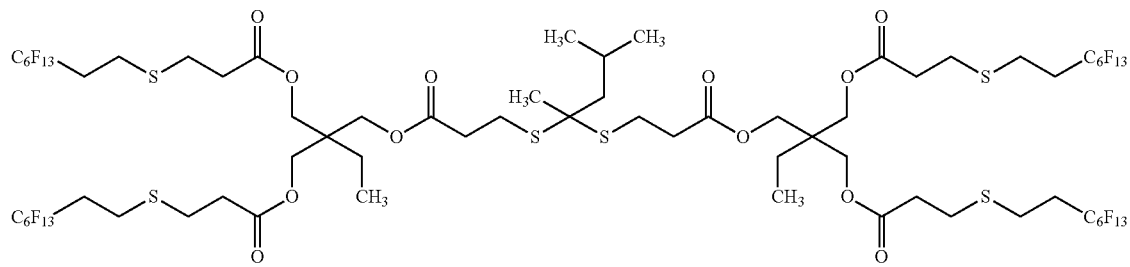

A 1-L jacketed, baffle reactor was fitted with a thermocouple, overhead stirrer, reflux condensor and $N_2$ source. To the reactor was added sequentially perfluorohexylethyliodide (178.0 g, rinsed with 50 g methyl isobutyl ketone) and 2-ethyl-2-(((3-mercaptopropanoyl)oxy)methyl)propane-1,3-diylbis-(3-mercaptopropionate) (50.0 g, rinsed with 50 g methyl isobutyl ketone) and methyl isobutyl ketone (MIBK, 400 g). The mixture was stirred at room temperature. After 1.5 hours, $K_2CO_3$ (69.4 g) and tetrabutylammonium iodide (1.8 g, 5 mmol) were added to the reactor. The reaction mixture was heated to 100° C. and stirred under $N_2$. The reaction mixture was concentrated under vacuum, and purified on a silica column (1:10, 1:7, 1:5, 1:4 ethyl acetate: hexanes as eluent). $^1$H NMR analysis performed in $CDCl_3$ confirmed the thioacetal structure. The final product was dispersed by dissolving 1.76 g of the product in 3.3 g of MIBK and adding 1.75 g of 1% sodium lauryl sulfate solution with 8.8 g of water. The mixture was sonicated twice for 1 min each, and then MIBK was removed by vacuum. The dispersion was dosed at 1000 ppm and tested according to the test methods above.

Example 2

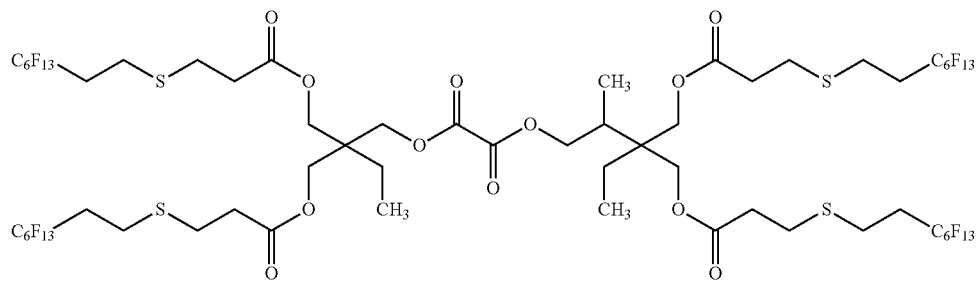

To a 100-mL round bottom flask, equipped with a nitrogen inlet and a magnetic stir bar, was added the hydroxy-functional fluorinated diester of Preparation 2 (3.7 g, 3.69 mmol) and dichloromethane (50 mL). The solution was cooled to 0° C. Oxalyl chloride (156 µL, 1.84 mmol), and triethylamine (772 µL, 5.54 mmol) were added, and the mixture was stirred for 1 hour at 0° C. before allowing to reach room temperature. The mixture was stirred overnight. After that time, the reaction mixture was partitioned with 50 mL of water, and the layers were separated. The bottom organic layer was concentrated in vacuum, and the residue was purified on a silica column (1:5, 1:3, 1:1 ethyl acetate: hexanes as eluent). The oxalyl diester was collected and dispersed by dissolving in MIBK (3.18 g) and adding 1% sodium lauryl sulfate solution (1.12 mL) and water (4 mL). $^1$H NMR analysis performed in $CDCl_3$ confirmed the structure. The mixture was sonicated twice for 1 min each, and then MIBK was removed by vacuum. The dispersion was dosed at 1000 ppm and tested according to the test methods above.

Example 3

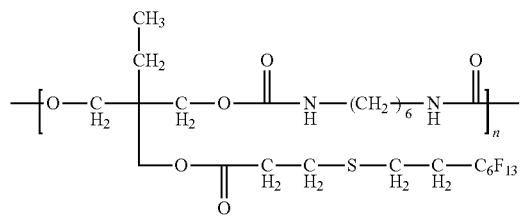

To a two-necked 100-mL round bottom flask, equipped with an internal thermometer, a reflux condenser, and a nitrogen inlet, was added the dihydroxy-functional fluorinated monoester of Preparation 2 (1.455 g, 2.56 mmol), and 1,6-diisocyanate (0.431 g, 2.56 mmol), followed by 10 mL of MIBK. To the mixture was added iron(III) chloride (0.001 g), and the mixture was heated to 80° C. with magnetic stirring for seven hours. After that time, ammonium hydroxide (337 µL) was added, and the mixture was allowed to reach room temperature while stirring. 20 mL of MIBK and 20 mL of water were added to the mixture, and the layers were separated. The organic layer was concentrated, and the residue dissolved in $CH_2Cl_2$. The solution was passed through a cotton plug and concentrated to yield 1.79 g of yellow liquid. The $M_n$ was determined by Test Method 4 to be 2518 Da.

To disperse, 1.74 g of the product was dissolved in methylisobutyl ketone (MIBK, 5 g), and then 1% sodium lauryl sulfate solution (1.8 mL) and water (4.5 mL) were added. The mixture was sonicated twice for 1 min, and the solvent was distilled from the dispersion. The dispersion was dosed at 1000 ppm and tested according to the test methods above.

To a two necked, 100 mL round bottom flask, equipped with a reflux condenser, a nitrogen inlet, and internal thermometer, were added 1,3,5-tris(6-isocyanatohexyl)-1,3,5-triazine-2,4,6-trione (0.415 g, 0.822 mmol), the hydroxy-functional fluorinated diester from Preparation 2 (2.472 g, 2.466 mmol), and methyl isobutyl ketone (10 mL). To this mixture was added iron (III) chloride (0.005 g, 0.031 mmol), and the final mixture was heated to 80° C. for 66 hours. The Example 4

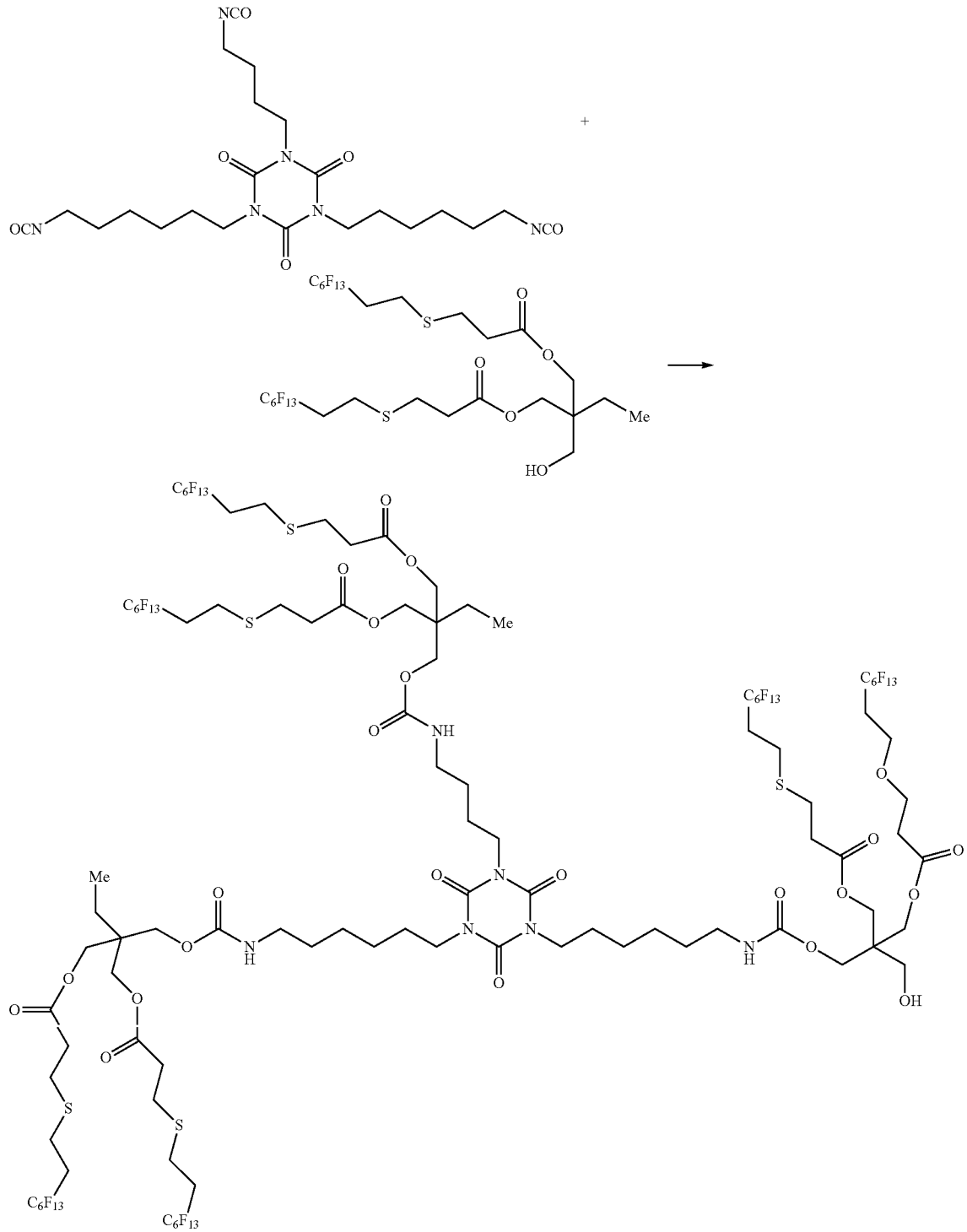

mixture was then cooled to room temperature, and 1 mL of water was added to quench the reaction. The mixture was stirred for 1 hour, and concentrated under vacuum. The residue was partitioned between methylene chloride (25 mL) and water (25 mL). The organic layer was filtered through a cotton plug, and concentrated, yielding 2.82 g of crude product. Purification by column chromatography (5:1, 3:1 of hexane:ethyl acetate) yielded 0.853 g of the product.

$^1$H NMR analysis performed in CDCl$_3$ confirmed the structure. To disperse, 0.500 g of the product was dissolved in methylisobutyl ketone (MIBK, 4 g), and then 1% sodium lauryl sulfate solution (0.505 mL) and water (4.2 mL) were added. The mixture was sonicated twice for 1 minute each, and the MIBK was removed by distillation. The dispersion was dosed at 1000 ppm and tested according to the test methods above.

TABLE 1

DPR (ΔL)* Performance of Examples 1-4 and Comparative Examples A-B in Exterior Paint

| Ex. | Initial | 1 day 1$^{st}$ dust | 1 day new dust | 1 day 2$^{nd}$ dust | 3 day 2$^{nd}$ dust | 3 day 3$^{rd}$ dust |
|---|---|---|---|---|---|---|
| 1 | 1.42 | 1.49 | 1.27 | 2.72 | 2.67 | 5.32 |
| 2 | 2.75 | 2.41 | 0.75 | 3.27 | 3.76 | 5.84 |
| 3 | 1.04 | 1.42 | 2.10 | 3.61 | — | — |
| 4 | 1.25 | 1.58 | 1.32 | 1.29 | 2.75 | 4.15 |
| A | 0.67 | 0.57 | 1.94 | 7.47 | 5.75 | 11.36 |
| B | 9.10 | 7.07 | 9.69 | 14.00 | 12.06 | 18.51 |

*A lower number indicates better performance.

TABLE 2

Contact Angle** Performance of Examples 1-4 and Comparative Examples A-B in Exterior Paint

| | Oil Contact Angle | | Water Contact Angle | |
|---|---|---|---|---|
| Ex. | Initial | 1 day new dust | Initial | 1 day new dust |
| 1 | 90.1 | 78.8 | 112.9 | 105.8 |
| 2 | 91.8 | 89.2 | 95.9 | 100.1 |
| 3 | 99.9 | 80.1 | 87.4 | — |
| 4 | 90.9 | 84.4 | 116.3 | 126.4 |
| A | 85.2 | 46.5 | 112.5 | 105.6 |
| B | 10.2 | 10.2 | 80.6 | 96.6 |

**A higher number indicates better performance.

What is claimed is:

1. A composition comprising (a) a coating base selected from a water-dispersed coating, an epoxy polymer coating, an alkyd coating, a Type I urethane coating, or an unsaturated polyester coating; and (b) a fluorinated ester compound having a plurality of fluoroalkyl thioether groups, said fluorinated ester compound selected from Formula (I), Formula (II), Formula (III), or Formula (IV):

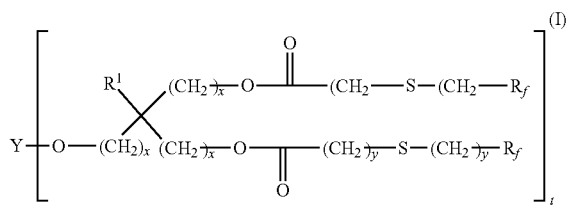

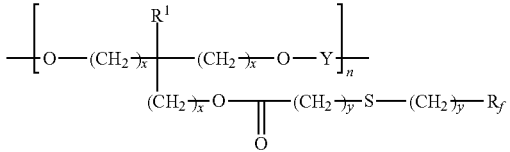

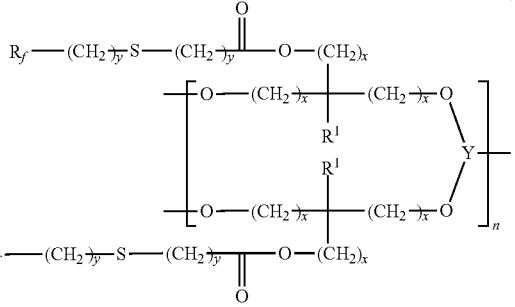

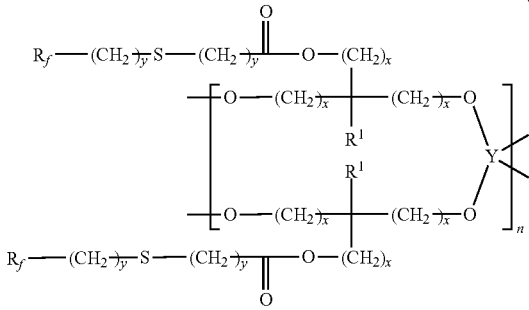

wherein
the number average molecular weight of the fluorinated ester compound is ≤30,000 Da;
$R^1$ is a linear or branched $C_1$ to $C_4$ alkyl group;
t is an integer of 2 to 4;
n is an integer 3;
x is independently an integer of 1 to 4;
y is independently an integer of 1 to 10;
Y is a linear or branched organic linking group that is divalent, trivalent, or tetravalent, selected from the group consisting of linear or branched $C_1$ to $C_{20}$ alkylene groups, carbonyl groups, thioether groups, aryl groups, cycloalkyl groups, ether groups, hydroxyl groups, —NHC(O)—, uretdione, allophanate, isocyanurate, and mixtures thereof; and
$R_f$ is independently a straight or branched perfluoroalkyl group of 2 to 20 carbon atoms, optionally interrupted by one or more $CH_2$, CFH, ether oxygens —O—, or combinations thereof.

2. The composition of claim 1, wherein the composition comprises (a) the coating base in an amount of from about 95 to 99.98% and (b) the fluorinated ester compound in an amount of from about 0.02 to 5% by weight, based on the total weight of (a) and (b).

3. The composition of claim 1, where the fluorinated ester compound is selected from Formula (I) and t is 2 or 3.

4. The composition of claim 1, where n is 3 to 15.

5. The composition of claim 1, where Y is selected from the group consisting of —(CH$_2$)$_z$C(R$^2$)(OH)(CH$_2$)$_z$—, an uninterrupted $C_1$ to $C_{20}$ linear or branched alkylene, —C(O)—C(O)—, —C(O)—(CH$_2$)$_z$—S—(CH$_2$)$_r$—S—(CH$_2$)$_z$—C(O)—, —C(O)—(CH$_2$)$_z$—O—(CH$_2$)$_r$—O—(CH$_2$)$_z$—C(O)—, —C(O)—(CH$_2$)$_z$—S—C(R$^2$)(R$^3$)—S—

$-(CH_2)_z-C(O)-$, $-C(O)-(CH_2)_z-O-C(R^2)(R^3)-O-(CH_2)_z-C(O)-$, $-C(O)NH-A-NHC(O)-$;

wherein z is an integer of 1 to 4; r is an integer of 1 to 20, $R^2$ is H, a linear or branched $C_1$ to $C_6$ alkyl group, or an aryl group; $R^3$ is H, a linear or branched $C_1$ to $C_6$ alkyl group, or an aryl group, and A is the residue from a polyisocyanate.

6. The composition of claim 5, where z is 1 and $R^2$ is H.

7. The composition of claim 5, where z is 2, $R^2$ is $-CH_3$, and $R^3$ is $-CH_2CH(CH_3)_2$.

8. The composition of claim 1, where the fluorinated ester compound (b) is water insoluble.

9. The composition of claim 1, where the coating base is a water-dispersed coating in the form of an aqueous acrylic latex paint.

10. The composition of claim 1, where the coating base comprises an additive selected from $TiO_2$, clays, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, blue pigments, red pigments, yellow pigments, orange pigments, process aggregated crystals, brown pigments, or green pigments.

11. An article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound having a plurality of fluoroalkyl thioether groups, said fluorinated ester compound selected from Formula (I), Formula (II), Formula (III), or Formula (IV):

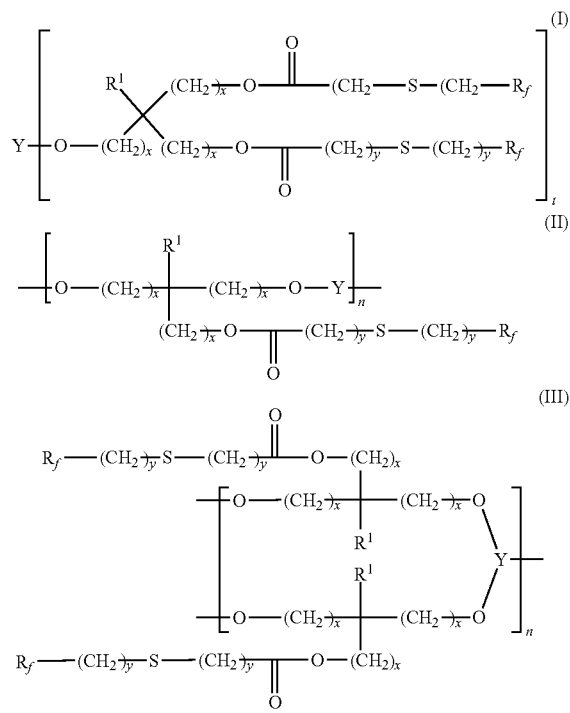

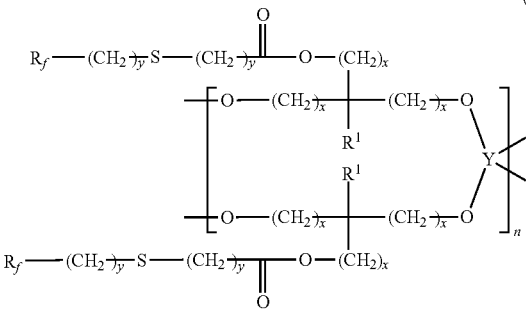

wherein
the number average molecular weight of the fluorinated ester compound is 30,000 Da;
$R^1$ is a linear or branched $C_1$ to $C_4$ alkyl group;
t is an integer of 2 to 4;
n is an integer $\geq 3$;
x is independently an integer of 1 to 4;
y is independently an integer of 1 to 10;
Y is a linear or branched organic linking group that is divalent, trivalent, or tetravalent, selected from the group consisting of linear or branched $C_1$ to $C_{20}$ alkylene groups, carbonyl groups, thioether groups, aryl groups, cycloalkyl groups, ether groups, hydroxyl groups, $-NHC(O)-$, uretdione, allophanate, isocyanurate, and mixtures thereof; and
$R_f$ is independently a straight or branched perfluoroalkyl group of 2 to 20 carbon atoms, optionally interrupted by one or more $CH_2$, CFH, ether oxygens $-O-$, or combinations thereof.

12. The article of claim 11, where Y is selected from the group consisting of $-(CH_2)_zC(R^2)(OH)(CH_2)_z-$, an uninterrupted $C_1$ to $C_{20}$ linear or branched alkylene, $-C(O)-C(O)-$, $-C(O)-(CH_2)_z-S-(CH_2)_r-S-(CH_2)_z-C(O)-$, $-C(O)-(CH_2)_z-O-(CH_2)_r-O-(CH_2)_z-C(O)-$, $-C(O)-(CH_2)_z-S-C(R^2)(R^3)-S-(CH_2)_z-C(O)-$, $-C(O)-(CH_2)_z-O-C(R^2)(R^3)-O-(CH_2)_z-C(O)-$, $-C(O)NH-A-NHC(O)-$;

wherein z is an integer of 1 to 4; r is an integer of 1 to 20, $R^2$ is H, a linear or branched $C_1$ to $C_6$ alkyl group, or an aryl group; $R^3$ is H, a linear or branched $C_1$ to $C_6$ alkyl group, or an aryl group, and A is the residue from a polyisocyanate.

13. The article of claim 11, wherein the composition comprises (a) the coating base in an amount of from about 95 to 99.98% and (b) the fluorinated ester compound in an amount of from about 0.02 to 5% by weight, based on the total weight of (a) and (b).

14. The article of claim 11, where the coating base is a water-dispersed coating in the form of an aqueous acrylic latex paint.

15. The article of claim 11, where the substrate is selected from the group consisting of wood, metal, wallboard, masonry, concrete, fiberboard, and paper.

16. The article of claim 11, where the fluorinated ester compound is selected from Formula (I) and t is 2 or 3.

17. The article of claim 11, where n is 3 to 15.

18. The article of claim 12, where z is 1 and $R^2$ is H.

19. The article of claim 12, where z is 2, $R^2$ is $-CH_3$, and $R^3$ is $-CH_2CH(CH_3)_2$.

20. The article of claim 11, where the coating base comprises an additive selected from $TiO_2$, clays, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, blue pigments, red pigments, yellow pigments, orange pigments, process aggregated crystals, brown pigments, or green pigments.

* * * * *